United States Patent [19]

Humberstone et al.

[11] Patent Number: 4,747,307

[45] Date of Patent: May 31, 1988

[54] LIQUID FLOW METER

[75] Inventors: Victor C. Humberstone, Cambridge; Dexter R. Plummer, Bishops Stortford, both of England

[73] Assignee: Ford Motor Company, Dearborn, Mich.

[21] Appl. No.: 6,520

[22] Filed: Jan. 23, 1987

[30] Foreign Application Priority Data

Jan. 25, 1986 [GB] United Kingdom ................ 8601851

[51] Int. Cl.⁴ ............................................. G01F 11/04
[52] U.S. Cl. ..................................................... 73/243
[58] Field of Search ......................... 73/239, 243, 244

[56] References Cited

U.S. PATENT DOCUMENTS

| | | | |
|---|---|---|---|
| 4,192,185 | 3/1980 | Keilholz | 73/243 |
| 4,195,752 | 4/1980 | Heimgartner | 222/61 |
| 4,331,033 | 5/1982 | Emerson | 73/243 |
| 4,356,727 | 11/1982 | Brown et al. | 73/243 |

FOREIGN PATENT DOCUMENTS

| | | |
|---|---|---|
| 1245165 | 1/1969 | United Kingdom . |
| 1252183 | 11/1971 | United Kingdom . |
| 1360800 | 7/1974 | United Kingdom . |

OTHER PUBLICATIONS

Instrumentation, Measuring & Testing-p. 12 Week D29 SU-767-528.

*Primary Examiner*—Herbert Goldstein
*Attorney, Agent, or Firm*—Allan J. Lippa; Peter Abolins

[57] ABSTRACT

A positive displacement liquid flow meter uses two variable volume chambers 16,18 arranged in parallel, each with a reciprocable piston 24,26. While liquid from one chamber is being fed to the outlet 11, the other chamber is being charged with the liquid from the inlet 10. A sensing piston 32 in the outlet line 11 indicates when flow variation occurs and allows a feed back signal to be produced to produce the necessary alteration in movement of the piston from the chamber which is feeding the outlet line. Valves A, B, C, D are provided on either side of each chamber, so that when a chamber is feeding it is isolated from the liquid supply.

10 Claims, 3 Drawing Sheets

LIQUID FLOW METER

This invention relates to a positive-displacement liquid flow meter for metering the volume flow of a liquid. The meter is particularly, but not exclusively, adapted to be used as a fuel flow meter in the testing of internal combustion engines.

With the great emphasis being placed nowadays on fuel economy, it is important for engine designers and manufacturers to be able to quantify accurately the fuel flow requirements of engines, so that they can decide, for example, if a particular change in an engine parameter results in an increase or decrease in fuel consumption. All engine development requires this information, but currently available meters do not possess sufficient accuracy to be able to provide engineers with the accurate and detailed information they require. Apart from the self-evident requirements of accuracy and repeatability of readings, it is also very important that a meter used for this purpose should have a very quick response time so that it can follow sudden changes in fuel demand by the engine, for example when the engine is accelerated sharply. It is also desirable that it should be able to provide fuel flow information over extremely short time periods.

According to the present invention, there is provided a positive-displacement liquid flow meter having an inlet and an outlet, two variable-volume chambers arranged in parallel between the inlet and the outlet, a pressure sensing device downstream of the chambers, and valves on either side of each chamber, wherein the chambers each comprise a cylinder with a moveable piston and drive means, responsive to the pressure sensing device, for moving the piston to vary the chamber volume, the meter also including control means for opening and closing the valves in a predetermined sequence to provide a continuous liquid flow from the outlet, and an output device for measuring piston movement to indicate the quantity of liquid flowing through the meter.

In one embodiment, the chambers are independent of one another and each has its own piston. However in a preferred embodiment, the chambers are formed at opposite ends of a common cylinder, with a single, double-acting piston dividing the cylindrical cavity into two parts and bounding each of the two chambers.

The pressure sensing device is preferably formed by a sensing piston floating on a column of liquid which is in communication with the meter outlet.

In operation, one chamber is being filled from the inlet, with the piston being correspondingly moved to increase the chamber volume, whilst the other chamber is feeding into the outlet. Once the chamber feeding into the outlet is empty, then the valves are switched over so that the other chamber, which is now full, feeds into the outlet while the first chamber is refilled from the inlet. In practice, to ensure a continuous regular flow, the opening and closing of the valves preferably overlap.

It is a principle of operation of the meter that the pistons exert no pressure on the liquid. Normally only one chamber is connected to the outlet, and so it is the movement of the piston associated with that chamber which is monitored to give a reading of liquid flow rate. The piston is moved by a solenoid arrangement using a voice coil, and the signal passed to the voice coil is derived from the sensing piston. While the fuel flow rate is constant, the sensing piston will not move and thus the signal passed to the voice coil will remain constant and the piston movement will remain uniform. If the liquid demand goes up, then the sensing piston will fall and a corresponding signal will be passed to the piston in the feeding chamber to speed up that piston.

Piston movement needs to be detected accurately in order to give the necessary accuracy of measurement, and it is preferred to use a Moire transducer to effect this measurement.

The output device receives signals responsive to piston movement. In the normal state when only one chamber is feeding, the signal from the other piston will be zero. However whilst the chambers are changing over, signals from both pistons will be positive and will be passed to the output device for summation. Additionally however there is a small flow associated with the sensing piston. When, for example, the flow rate diminishes, the sensing piston rises and the volume of liquid downstream of the chambers increases. As a steady state is once again attained, this small extra volume of liquid is fed into the outlet line, and preferably the output device also receives a signal from the sensing piston (movement of the sensing piston can also be picked up by a Moire transducer) and this signal is then summed with the signals from the main metering pistons to give the final volume flow rate reading.

The invention will now be further described, by way of example, with reference to the accompanying drawings, in which.

Figure 1:
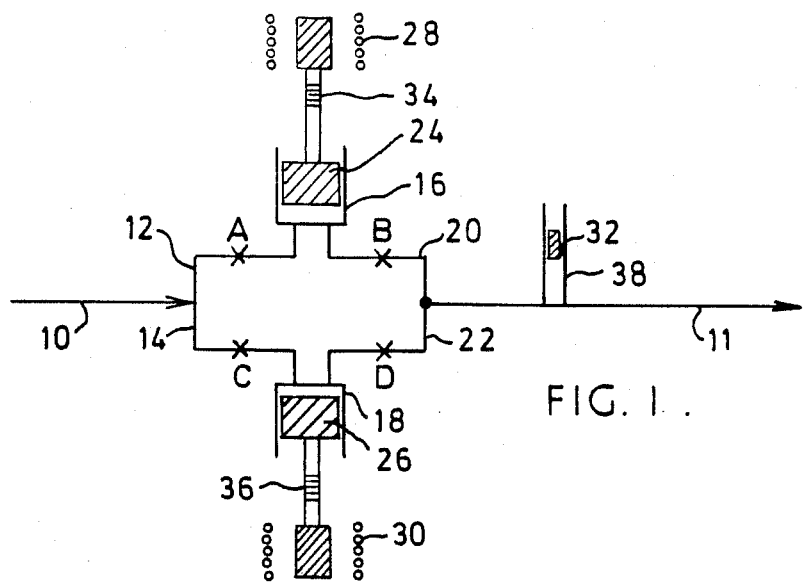
FIG. 1 shows schematically a first form of meter in accordance with the present invention.

The meter shown in FIG. 1 is connected in a liquid supply line so that one part 10 of the supply line becomes the inlet to the meter and another part 11 becomes the outlet from the meter. The line 10 splits into two branches 12 and 14. The branch 12 leads to a first variable-volume chamber 16 and the branch 14 leads to a second variable-volume chamber 18. From the chambers 16 and 18, branches 20 and 22 respectively lead into the common outlet line 11.

Solenoid valves A, B, C and D are arranged in each of the branches 12, 20, 14 and 22 respectively.

The chambers 16 and 18 each include moveable pistons 24 and 26 which can reciprocate in the chambers to vary the chambers volumes. The pistons 24 and 26 are moved electromagnetically by voice coils 28, 30.

In the outlet line 11 a sensing piston 32 is arranged which floats on a column of liquid in a communication with the liquid in the line 11.

The two pistons 24 and 26 work in opposition, with piston 24 taking in fuel from the supply 10 (inlet valve A open, piston 24 moving towards bottom dead centre) whilst piston 26 is delivering fuel via its exhaust port (valve D open) by moving towards top dead centre. At BDC/TDC respectively the inlet valve A to piston 24 closes and the outlet valve B opens and for piston 26 the inlet valve C opens and the outlet valve D closes.

There are no leakage problems with this meter because it is ensured that the exhaust valve (B or D) is always closed when the corresponding inlet port (A or C) is open.

The volume flow is obtained by measuring the displacement of the pistons 24 and 26. This is done to a high degree of accuracy using Moire transducers 34 and 36 which sense piston movement. Moire transducers essentially consist of a pair of optical gratings aligned at a small angle to each other. This produces a series of millimeter-sized opaque and transparent bands from a micron-sized grating pitch. A micron-sized horizontal movement of one grating with respect to the other then produces millimeter-sized movement of the opaque and transparent bands, which alternately allows and prevents the passage of light from a light source to a photodetector. In this way a micron-scale movements can conveniently be sensed by available LED light sources and photodiode detectors with millimeter-scale active dimensions. In this application, one grating will be attached to the moving piston shaft whilst the other is held stationary.

Displacement is therefore measured by counting the passage of bright and dark bands. The method is digital in nature, and of inherent high repeatability and reliability.

In operation, the amount of flow delivered by each of the pistons is directly available from the Moire transducer rigidly coupled to each piston. The output flow from both pistons is combined and enters the outlet line 11 in which the sensing piston 32 is located. This sensing piston also carries a Moire transducer and fits with a close mechanical tolerance in a vent tube 38. If the sum of the flows from the chambers 16 and 18 exceeds the flow demand, the pressure drop across the sense piston 32 drives it upwards. Similarly, if the flow provided is less than the demand, the piston is driven downwards. The position of the sense piston 32 can therefore be used to control the flow delivery from the two pistons via a servo loop to match the engine flow demand. This volumetric control approach employs a digital, drift free transducer (ie the sensing piston 32 with its Moire encoder), rather than an analogue pressure transducer, and can also be arranged to provide fuel overflow if the sensing piston moves out of range due to servo failure. If a sealed system using a pressure transducer was employed, servo failure could result in damage to the transducer.

When the meter is at the cross-over point where flow transfers from chamber 18 to chamber 16, a simple abrupt transition in flow could be used by simultaneously switching over all the valves A, B, C and D. The valves could in this case be simple on/off valves. However this would undoubtedly produce irregularities in the flow since neither the piston 24 or 26 can be accelerated or decelerated instantaneously. It is preferred therefore to have a short time during which both pistons deliver fuel and during this short period the fuel supply may temporarily exceed or under provide the fuel demand. However this excess or shortfall will be registered by the sensing piston 32, and volume displacement of the sensing piston will be equal to the error. Therefore at all times the actual flow taken by the engine is given by $$\text{Flow} = \frac{\text{Piston 24}}{\text{displacement}} + \frac{\text{Piston 26}}{\text{displacement}} + \frac{\text{Sensing piston 32}}{\text{displacement}}$$

It is therefore unnecessary to wait until the time-averaged position of the sense piston is near zero before an accurate measure of flow can be provided.

Figure 2:
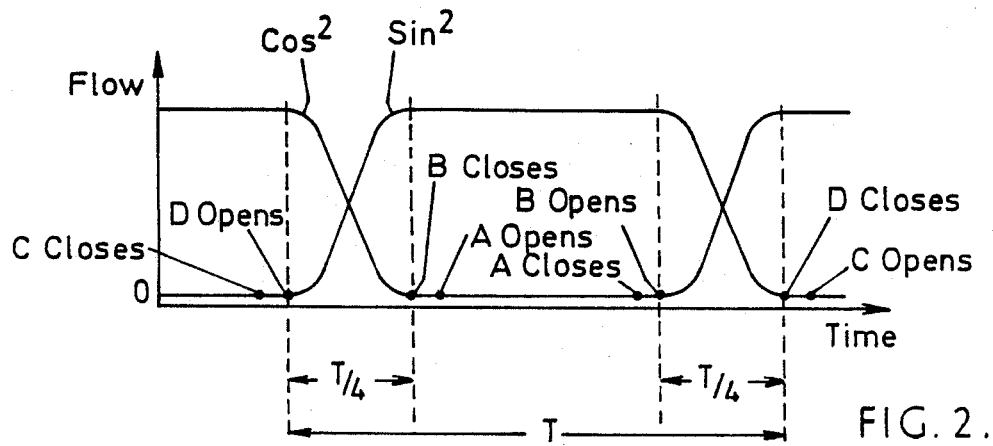
FIG. 2 is a graph of flow against time in respect of operation of the meter shown in FIG. 1.

Further refinement to the metering process can be provided at the cross-over point, if desired. The velocity (and therefore flow) of piston 24 can be gradually decreased below that needed to satisfy the demand, and that of piston 26 can be gradually increased, so that the sum of the flows from the two pistons closely equals the flow demand. This can be done either by a $\sin^2(at)$ and $\cos^2(at)$ showing a flow between pistons 24 and 26 (as shown in FIG. 2) or a $\frac{1}{2}(1-at)$ and $\frac{1}{2}(1+at)$ showing a flow between Pistons 24 and 26 where t=time and a=constant.

Then total flow is given by $$\text{Flow} = F\sin^2(at) + F\cos^2(at) = F$$

or $$\text{Flow} = F\tfrac{1}{2}(1-at) + F\tfrac{1}{2}(1+at) = F$$

The flow delivered remains equal to the flow demand at all times during changeover. This also holds true, of course, when the flow demand, F, is time-dependent, F=F(t).

This ensures a minimised volume displacement of the sense piston 32, which therefore can be made with small stroke and cross-section, giving very rapid response. The shareout of flow at the cross-over point is controlled from the positions of pistons 24 and 26 within their strokes, as measured by their Moire encoders, by means of an 'inner' servo loop. This refinement is not essential, but is available to give accuracy and quick response.

Figure 3:
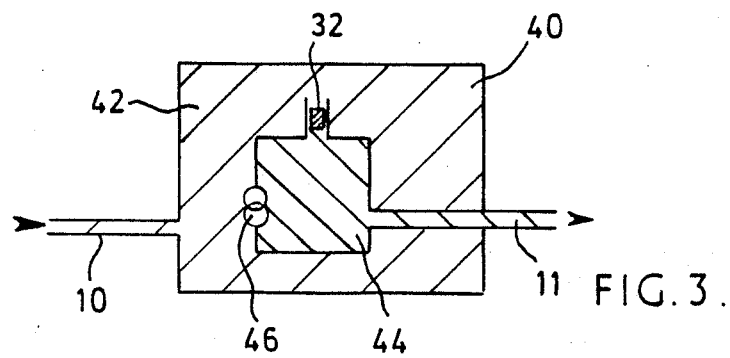
FIG. 3 shows schematically an installation of the meter in a liquid supply line.

In order to further improve the sense piston response time, the meter can be arranged within a flooded chamber so that liquid is present on both sides of the sensing piston 32. In this figure the inlet line 10 leads into an outer chamber 40 which is entirely flooded with liquid 42. The meter itself is mounted in a wall of an inner enclosure 44, and the meter is indicated schematically in FIG. 3 at 46. Liquid flowing from the outer enclosure 40 into the inner enclosure 44 flows through the meter 46 and out through the outlet line 11. The sensing piston 32 is now influenced by pressure from the enclosure 40 on one side and pressure from the enclosure 44 on the other side.

If the meter delivers an excess of flow, then the sensing piston 32 is driven upwards, as before. If it delivers a shortfall, the liquid pressure in the outer enclosure 40 drives it downwards. This avoids the need to rely upon the mass of the sensing piston itself or on an auxiliary magnetic field to return the sensing piston to its zero position.

Figure 4:
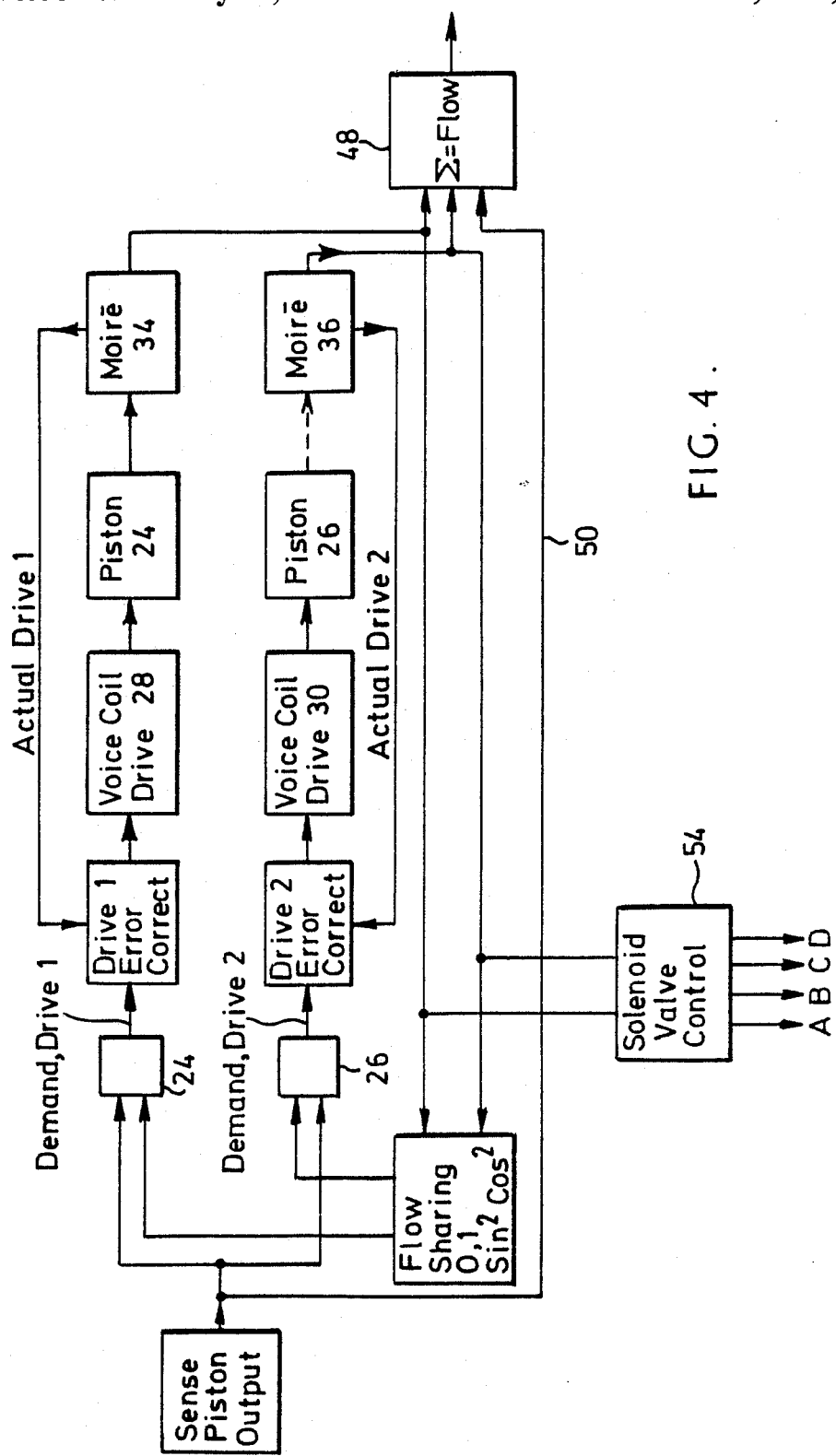
FIG. 4 is a block diagram illustrating the operation of the output device of the present invention.

The servo control system for the voice coil drive and for forming the output metered flow is shown in FIG. 4. It will be seen that the output from the sensing piston provides signals to the drives for the pistons 24 and 26. A feed back system in each drive circuit ensures that the correct piston drive rate is maintained.

Signals from the Moire transducers 34 and 36 are passed to a summation unit 48, and a third signal 50 derived from sensing piston movement is also fed to the same summation unit. The output signal from this unit 48 therefore represents the total flow for the meter.

A control 54 for the solenoid valves A, B, C and D is also connected into the circuit. The two 'inner' loops of the servo control the 'sharing' of the flow demand between pistons at various points during the meters cycle; the 'outer' loop ensures that the sum of flows from both pistons matches the flow demand.

Figure 5:
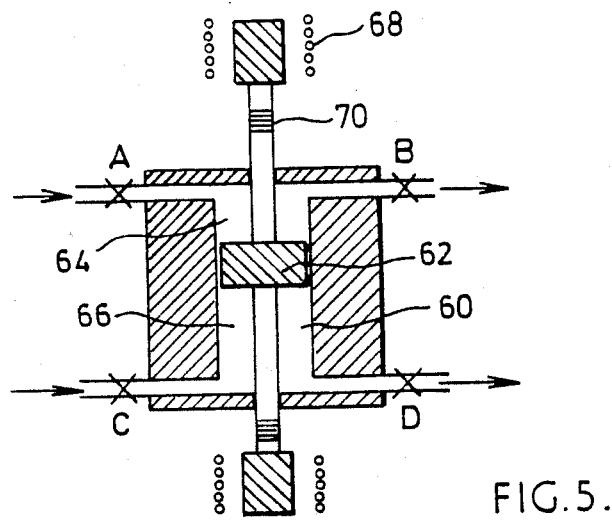
FIG. 5 is a schematic view of a second form of meter in accordance with the invention.
Figure 6:
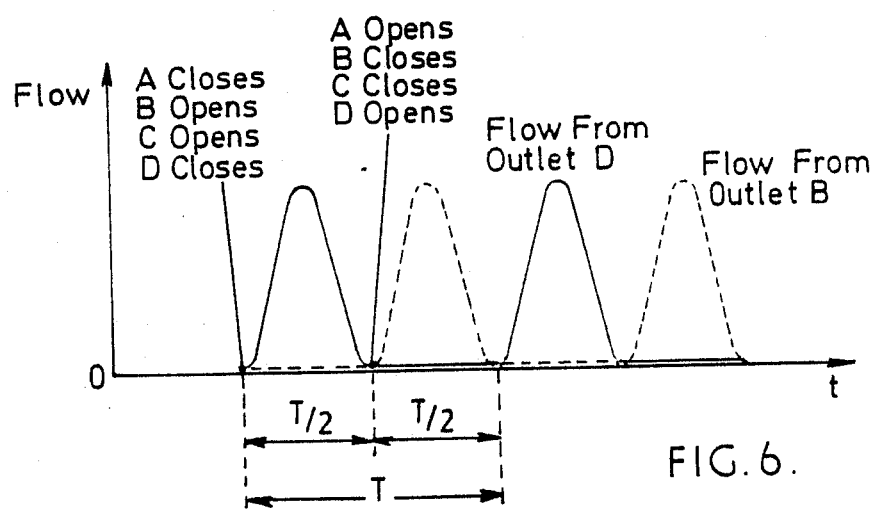
FIG. 6 is a graph of flow rate against time in respect of the meter shown in FIG. 5.

FIG. 5 shows a second version of a meter. Only that part between the solenoid valves A, B, C, D is shown, Other parts of this meter will be as shown in the other figures. The meter is formed in a single body with a central cylindrical cavity 60 divided by a single double-acting piston 62 into upper and lowr chambers 64 and 66. As in the embodiment shown in FIG. 1, a voice coil drive 68 moves the piston and a Moire transducer 70 is used so that the movement can be read.

The piston 62 therefore both intakes liquid and delivers liquid at all points during its stroke. This reduces the piston velocities (and therefore acceleration) necessary to achieve a given flow, so that the forces that must be supplied to enable a given rate of flow delivery can be reduced.

This form of the meter requires shaft seals to be made to the piston shaft at both ends. Although two voice coils 68 and two transducers 70 are shown, the meter could work with one coil and one transducer only.

The single-acting meter of FIG. 1 can achieve the following performance
flow range of 700:1 from 0.1 kg/hr to 70 kg/hr
response time <0.1 s
accuracy of +/−0.25% for flows of 0.1 kg/hr in times above 0.7 s.
Above 0.7 kg/hr, accuracy of +/−0.25% is possible in 0.1 s.
ability to meter to +/−0.25% accuracy, a flow changing from 0.1 to 33 kg/hr in 1 s.

The double-acting meter shown in FIG. 5 can achieve the following performance
flow range of 700:1 from 0.1 kg/hr to 70 kg/hr
response time below 0.1 s
accuracy of +/−0.25% in 0.2 s at 0.1 kg/hr if required.
Above 0.2 kg/hr accuracy of +/−0.25% can be achieved in 0.1 s
ability to meter to 0.25% accuracy a flow changing from 0.1 to 35 kg/hr in 1 s The meter described is able to meet the desired criteria of reliability by the use of active components below their upper limits of capability, eg solenoid valves, voice coil drive etc. and by the avoidance of side loads on, or mechanically operated porting by the pistons.

Repeatability of readings from the meter will be assured by employing direct measurement of fuel flow by the techniques of displacement and time measurement, by using digital transducer techniques that avoid drift and by metering the 'error flow' sensed by the sensing piston 32.

If desired, more than one meter could be used in parallel to extend flow range capability, and this is helped by the use of digital pickoff techniques.

We claim:
1. A positive displacement liquid flow meter comprising:
   an inlet and an outlet;
   a pair of fluid lines connected in parallel between the inlet and the outlet;
   two variable-volume chambers, each being coupled to one of the pair of fluid lines;
   a pressure sensing device downstream of the chambers;
   a pair of inlet valves, each connected to one of the pair of fluid lines upstream of one of the chambers;
   a pair of outlet valves, each connected to one of the pair of fluid lines downstream of one of the chambers;
   the chambers each comprise a cylinder with a moveable piston and drive means, responsive to the pressure sensing device, for moving the piston to vary the chamber volume;
   control means for opening and closing the pair of inlet valves and the pair of outlet valves in a predetermined sequence to provide a continuous liquid flow from the outlet; and
   an output device for measuring piston movement to indicate the quantity of liquid flowing through the meter.

2. A flow meter as claimed in claim 1, wherein the chambers are independent of one another and each has its own piston.

3. A flow meter as claimed in claim 1, wherein the chambers are formed at opposite ends of a common cylinder, with a single, double-acting piston dividing the cylindrical cavity into two parts and bounding each of the two chambers.

4. A flow meter as claimed in claim 1, wherein the pressure sensing device is formed by a sensing piston floating on a column of liquid which is in communication with the meter outlet.

5. A flow meter as claimed in claim 1, wherein control means is arranged to ensure a continuous regular flow of liquid, and so that the opening and closing of the valves overlap.

6. A flow meter as claimed in claim 1, wherein the pistons are moved by a solenoid arrangement using a voice coil, and the signal passed to the voice coil is derived from the pressure sensing device.

7. A flow meter as claimed in claim 1, wherein piston movement is measured by the use of a Moire transducer.

8. A flow meter as claimed in claim 1, wherein the output device is supplied with signals from both chambers and from the pressure sensing device.

9. A flow meter as claimed in claim 1, wherein the pressure sensing device is acted upon from one side by the liquid pressure in the outlet and from the other side by the liquid in the inlet.

10. A flow meter as claimed in claim 9, wherein the meter, including the pressure sensing device, is submerged in a liquid enclosure communicating with the inlet and containing liquid at inlet pressure.

* * * * *